United States Patent
Mortensen

(10) Patent No.: US 7,281,902 B2
(45) Date of Patent: Oct. 16, 2007

(54) METHODS OF MOUNTING A WIND TURBINE, A WIND TURBINE FOUNDATION AND A WIND TURBINE ASSEMBLY

(75) Inventor: Henrik Kindberg Mortensen, Sabro (DK)

(73) Assignee: Vestas Wind Systems A/S (DK)

( * ) Notice: Subject to any disclaimer, the term of this patent is extended or adjusted under 35 U.S.C. 154(b) by 70 days.

(21) Appl. No.: 10/516,195

(22) PCT Filed: May 27, 2002

(86) PCT No.: PCT/DK02/00359

§ 371 (c)(1),
(2), (4) Date: Nov. 29, 2004

(87) PCT Pub. No.: WO03/100178

PCT Pub. Date: Dec. 4, 2003

(65) Prior Publication Data

US 2005/0163616 A1 Jul. 28, 2005

(51) Int. Cl.
*F03D 11/00* (2006.01)

(52) U.S. Cl. .................. 416/244 R; 52/40; 52/296

(58) Field of Classification Search .............. 415/4.1, 415/4.3, 4.5; 416/244 R; 52/40, 169.13, 52/296, 741.15, 745.17; 174/45 R; 343/875
See application file for complete search history.

(56) References Cited

U.S. PATENT DOCUMENTS 3,530,947 A 9/1970 Gendron
3,686,877 A 8/1972 Bodin
4,711,601 A * 12/1987 Grosman ............... 405/204
5,653,556 A 8/1997 White
6,582,158 B1 * 6/2003 Van Stein .............. 405/228

FOREIGN PATENT DOCUMENTS

| DE | 201 00 588 | 3/2001 |
| DE | 201 09 981 | 4/2001 |
| DK | 1999 00164 | 9/2000 |
| GB | 2 327 970 | 2/1999 |
| WO | WO 01/71105 | 9/2001 |

OTHER PUBLICATIONS

International Search Report; PCT/DK02/00359; Feb. 10, 2003.
International Search Report; PCT/DK02/00359 Feb. 10, 2003.

* cited by examiner

*Primary Examiner*—Edward K. Look
*Assistant Examiner*—Dwayne J White
(74) *Attorney, Agent, or Firm*—Cantor Colburn LLP

(57) ABSTRACT

The invention relates to a method of mounting a wind turbine at a mounting location, said method comprising the steps of providing a foundation (33A, 33B), said foundation comprising a foundation body and pre-fitted upper attachment means vibrating at least a part of the foundation into the earth by transferring of vibrations into the structure of the foundation, mounting at least a part of said wind turbine to said upper attachment means (12) of said foundation. According to the invention, large scale wind turbines, especially offshore wind turbines, may be transported and mounted at the site in a cost-effective and expedient way.

32 Claims, 8 Drawing Sheets

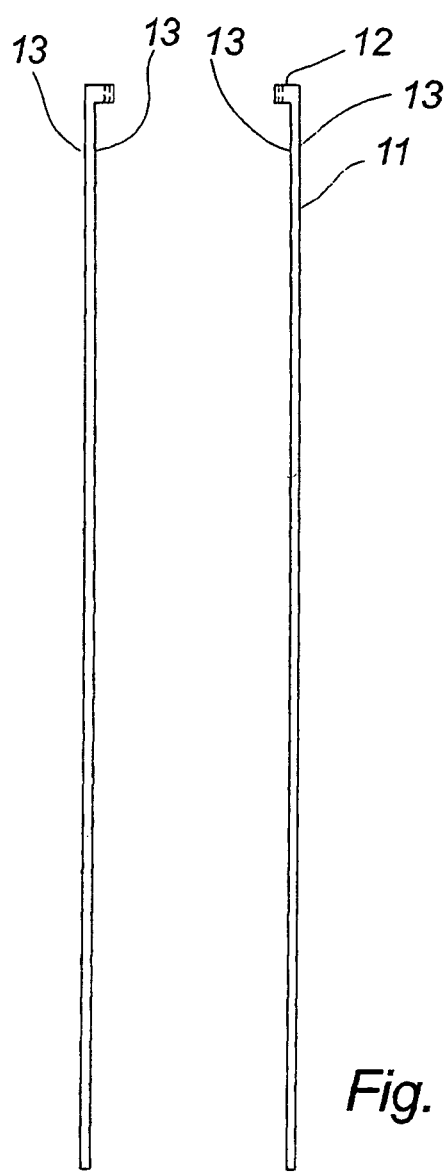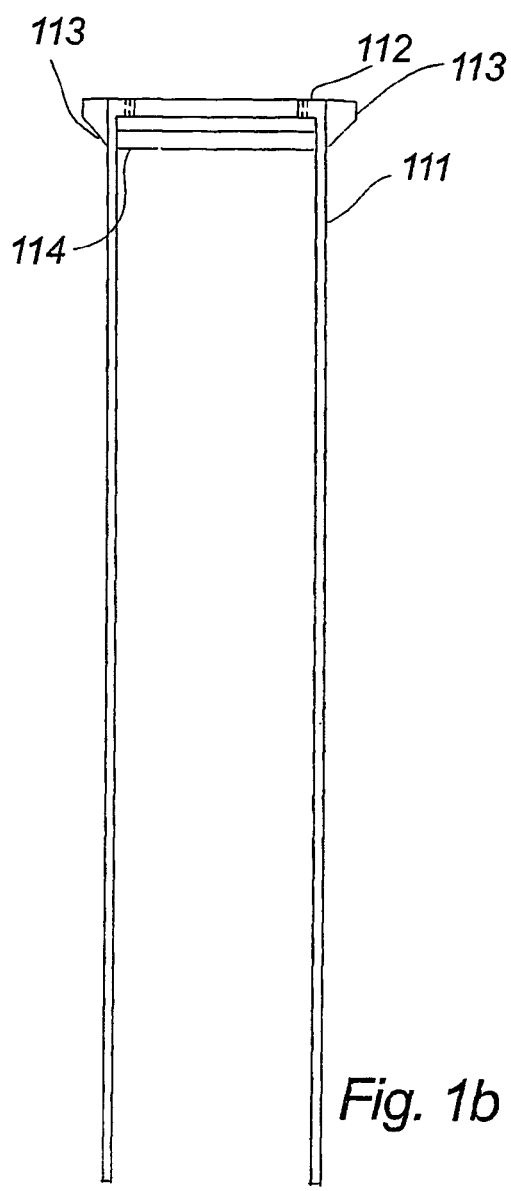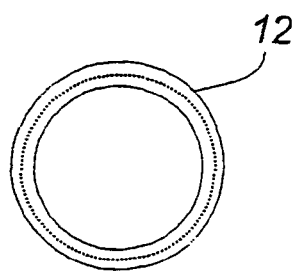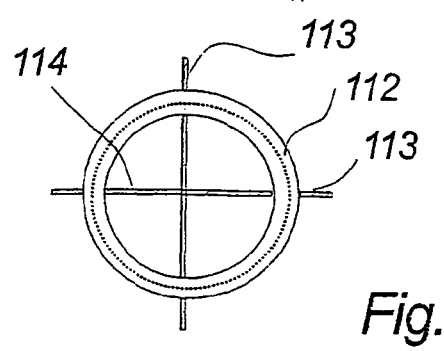
Fig. 1a
Fig. 1b
Fig. 1

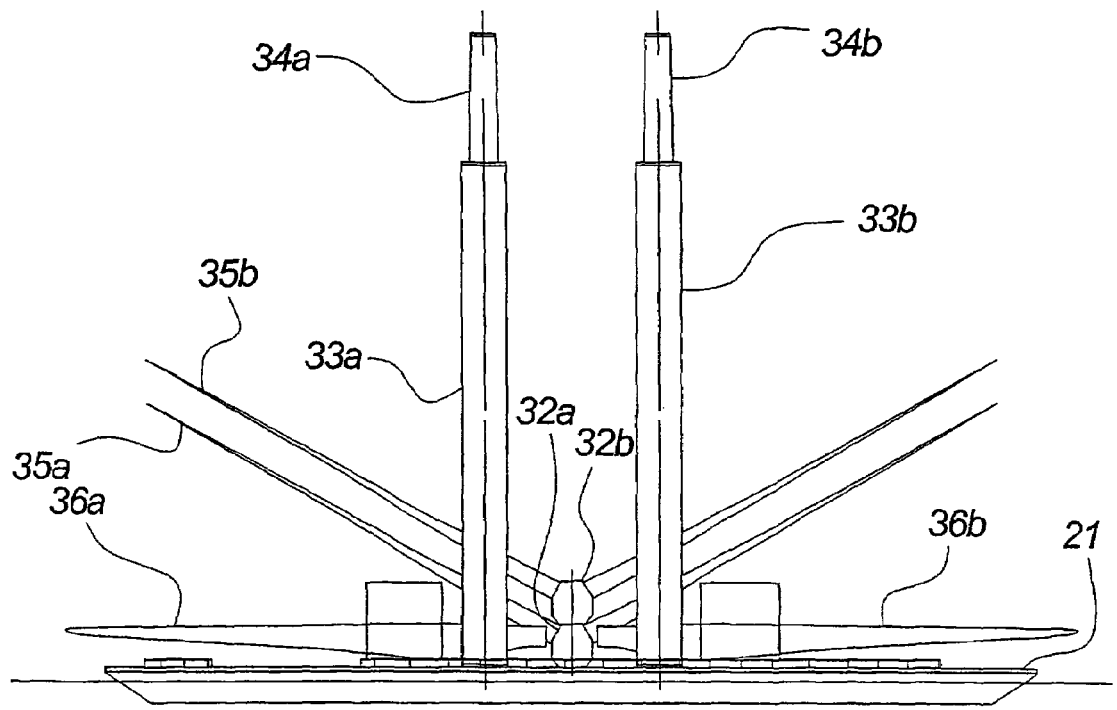
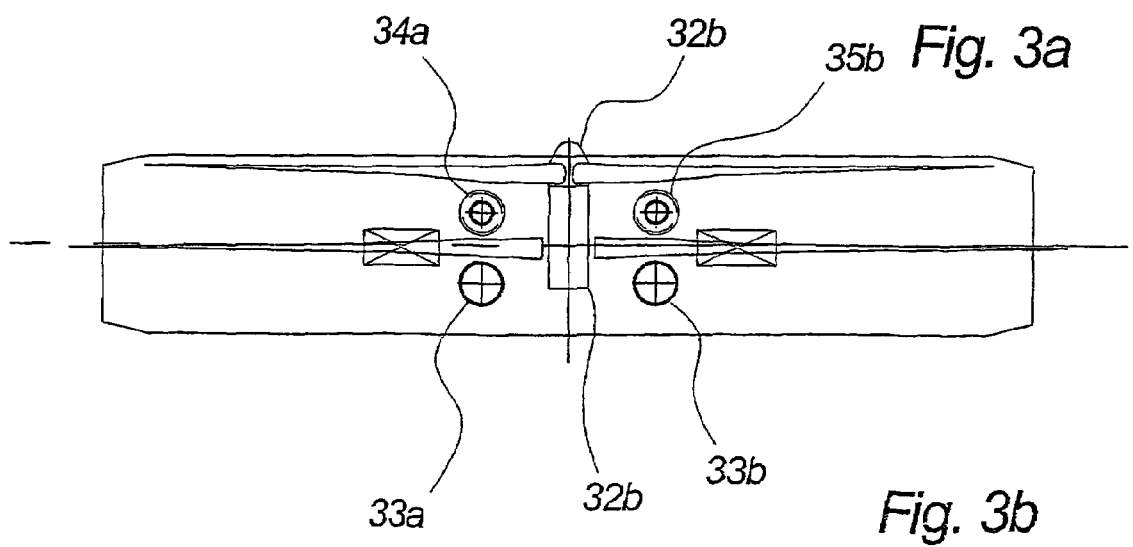
Fig. 3a
Fig. 3b

METHODS OF MOUNTING A WIND TURBINE, A WIND TURBINE FOUNDATION AND A WIND TURBINE ASSEMBLY

FIELD OF THE INVENTION

The invention relates to a method of mounting a wind turbine at a mounting location as claimed in claim 1, a wind turbine foundation and a wind turbine assembly.

BACKGROUND OF THE INVENTION

It is well known that mounting of wind turbines has become a still more challenging exercise, incorporating both advanced logistic planning and up-front technical measures.

This is partly due to the fact that the overall dimensions of commercially attractive wind turbines has increased and e.g. partly to the fact that focus of mounting wind turbines are gradually shifted from traditional mounting locations to more extreme and difficult accessible areas, such as mountain areas and a offshore wind turbine parks.

One method dealing with mounting of offshore wind turbines has been disclosed in WO 99/43956, where foundation and the complete wind turbine are transported to the mounting location and mounted in one piece. This method may be advantageous for some purposes, but may lack applicability when dealing with large-scale wind turbines.

SUMMARY OF THE INVENTION

The invention relates to a method of mounting a wind turbine at a mounting location,
said method comprising the steps of
providing a foundation (33A, 33B)
said foundation comprising a foundation body and pre-fitted upper attachment means
vibrating at least a part of the foundation into the earth by transferring of vibrations into the structure of the foundation,
mounting at least a part of said wind turbine to said upper attachment means of said foundation.

According to the invention, the foundation may be vibrated into the earth, thereby avoiding structure weakening hammering of foundation. Moreover, the upper part of the foundation, e.g. the flange, may be pre-fitted to the foundation structure, thereby minimizing the work on the site while attaching the tower to the foundation.

According to one embodiment of the invention, it has been recognized that a foundation may be vibrated completely into the intended position, even without applying impact hammering. Therefore, among many, two significant advantages has been obtained in the sense that the foundation may be dimensioned to withstand normal stress and strain and not also to withstand e.g. impact hammering.

Moreover, the avoidance of impact hammering results in an significant improvement with respect to the positioning of the foundation itself, in the sense that an impact hammer may be avoided. Impact hammering it not only relatively expensive itself, but the coordination of different technical equipment may be eased significantly.

A further advantageous feature of the invention is that a wind turbine foundation, which has been vibrated into the final position may be removed again by means of vibration equipment.

This feature is extremely important, when approval of wind turbines in certain areas prerequisites a plan for decommissioning, i.e. the removal of the complete construction at the end of the lifetime of the structure.

Moreover, and this is of particular relevance for offshore wind turbines, the foundation must be positioned and having a relatively low inclination with respect to the vertical direction. According to the invention, it is now possible to obtain an inclination of less than approximately 0.5 degrees.

When vibrating a foundation into the sea underground, a further advantageous feature of the invention may be observed in the sense that misalignments may be adjusted by means of the vibration equipment. This is typically not possible, when applying impact hammering. Moreover, it should be noted that the injection equipment applied for the injection of the foundation into the underground is positioned relatively remote to the contact interface between the sea bottom and the cranes and the impact hammer.

As stated, the pre-fitted upper attachment means should preferably constitute a part of the foundation structure, which, when vibrated are substantially unstressed and therefore not weakened in the main structure.

According to the invention, at least two of the main parts of the wind turbine may be lifted and mounted separately, i.e. the foundation and further components such as the tower and the wind turbine nacelle and e.g. the blades.

According to the invention, large scale wind turbines, especially offshore wind turbines, may be transported and mounted at the site in a cost-effective and expedient way.

According to the invention, the mounting of e.g. offshore wind turbines has become an industrialized process.

When said vibrations being established and transferred into the foundation body of the said foundation, a further advantageous embodiment of the invention has been obtained.

When said vibrations being transferred into the said foundation via the sidewall(s) of said foundation, a further advantageous embodiment of the invention has been obtained.

According to the invention, the vibrations may be transferred directly into the foundation instead of transferring the vibrations into the foundation via the upper attachments means. In this way, the attachment, e.g. welding, between the foundation and upper attachment is substantially unaffected by a vibrations transferred into the foundation structure.

When said pre-fitted attachment means comprising at least one flange to which said at least a part of said wind turbine may be attached to, a further advantageous embodiment of the invention has been obtained.

When whereby said vibrating is performed by transferring of vibrations into the foundation structure via contact portions of the sidewall(s) of said foundation, a further advantageous embodiment of the invention has been obtained.

When transmitting the major part of the vibrations directly into the main body of the foundation substantial damage or weakening of the upper attachment means, e.g. a flange, may be avoided. In this way, immediate further mounting of the wind turbine elements may be performed, when the foundation is correctly positioned.

When said vibrating is performed by means of at least one vibration arrangement fastened to said at least a part of said foundation by means of clamping means, a further advantageous embodiment of the invention has been obtained.

When said clamping means comprises hydraulic clamps, a further advantageous embodiment of the invention has been obtained.

When said vibrations are established by means of vibrating means fitted to the foundation.

When fitting the vibrator fixedly to the foundation, the vibrator may be lifted together with the foundation. Typically, the foundation should be suspended in the vibrator, when the vibrator is lifted by the crane.

When said foundation and said vibrations means may be lifted and positioned by means of lifting means, such as a crane, a further advantageous embodiment of the invention has been obtained.

When said foundation is suspended in said vibration arrangement when the foundation is lifted and positioned by means of lifting means at said mounting location, the vibration arrangement may be applied as a crane-hook like adapter between the crane and the foundation. In this way, the vibrator(s) may be pre-fitted to the foundation structure prior to the positioning (e.g. in water) and lifted together with the foundation. Thereby complex attachment procedure at the mounting site may be minimized or completely avoided.

When said foundation, when lifted by said lifting means, is suspended in said vibration means, a further advantageous embodiment of the invention has been obtained.

When said foundation comprising at least one mono pile, a further advantageous embodiment of the invention has been obtained. The foundations structures may e.g. comprises steel structures, concrete structures. Foundations, e.g. mono-pile like may also be referred to as caissons within the art.

It should be noted that a foundation may e.g. comprise a tripod and that the individual components may be vibrated into the underground separately.

When said at least a part of said wind turbine comprises a wind turbine tower comprising at least one flange adapted for attachment to said at least one foundation, a further advantageous embodiment of the invention has been obtained.

When said wind turbine tower preferably comprises a substantially one-piece tower, a further advantageous embodiment of the invention has been obtained.

According to the invention, the wind turbine tower should preferably be pre-made in one piece in order to avoid unnecessary work at the mounting site, and moreover to avoid too much maintenance subsequently to the mounting of the wind turbine.

When said wind turbine being an offshore wind turbine, a further advantageous embodiment of the invention has been obtained.

When said wind turbine being transported to said mounting site by means of floating, means, such as a barge, a further advantageous embodiment of the invention has been obtained.

When wherein two blades of said wind turbines are pre-fitted to the hub of the nacelle, thereby facilitating stacking of the pre-fitted nacelles and of the remaining blades, a further advantageous embodiment of the invention has been obtained.

According to the invention, two or further nacelles should be stacked on the barge in order to simplify both the packing of the wind turbine components on the barge or any suitable floating transporting arrangement. Moreover, this advantageous two-wing pre-fitting, facilitates an advantageous vertical fitting of the remaining wing (When dealing with three-wing structures).

Moreover, the invention relates to a wind turbine foundation, said wind turbine foundation comprising at least one upper attachment arrangement (12) and at least one gripping portion (13) to which a vibration arrangement (90) may be attached and where said gripping portion (13) comprises at least a part of the side-wall of said foundation. When the at least one upper attachment arrangement comprises at least one upper flange, a further advantageous embodiment of the invention has been obtained.

According to the invention a flange represents a practical attachment arrangement to which wind turbines may be attached securely on the mounting site.

When said foundation is pre-manufactured, a further advantageous embodiment of the invention has been obtained.

According to the invention, the pre-manufacturing of the complete foundation as a foundation which may be positioned and secured in the underground and subsequently be mounted with a wind turbine tower without any further structural modifications of the foundation, facilitate an easy and cost effective way of mounting foundations on less accessible sites.

Moreover, the invention relates to a wind turbine assembly comprising
at least one wind turbine foundation (33a, 33b)
at least one wind turbine tower (34a, 34b)
at least one vibration arrangement (92, 102)
at least one maritime vessel (21) adapted for transportation on sea of said at least one wind turbine foundation, at least one lift arrangement (22) comprising means for positioning said at least one wind turbine foundation and said vibration arrangement (92, 102) at the mounting location.

When said lift arrangement comprises means for lifting and positioning and attaching said vibration arrangement (92, 102) to said at least one wind turbine foundation (33a, 33b) a further advantageous embodiment of the invention has been obtained.

When said foundation comprises a foundation according to any of the claims 18-24 a further advantageous embodiment of the invention has been obtained.

It should be noted, among other further advantages, that the invention facilitates a significant simplification of the work-process on-site, e.g. an offshore site where things are a little more complicated than they are on shore.

According to a preferred embodiment of the invention, the mounting location may advantageously comprise an offshore-site, in which the benefits of the invention may be fully exploited.

THE FIGURES

The invention will now be disclosed in details with reference to the figures, where FIGS. 1a and 1b illustrates an offshore wind turbine foundation, FIG. 2 illustrates an assembly of a crane and a wind turbine component transporting barge, FIG. 3 to FIG. 8 illustrate the mounting of a wind turbine according to one embodiment of the invention, step by step, and where FIGS. 9 and 10 illustrate vibrators adapted for vibration of a wind turbine foundation into the earth.

DETAILED DESCRIPTION OF THE INVENTION

FIGS. 1a and 1b illustrates an offshore wind turbine foundation according to one preferred embodiment of the invention.

The illustrated offshore wind turbine foundation of FIG. 1a may be pre-manufactured onshore comprising both a main foundation body 11 and an upper attachment, here constituted by a flange 12.

Portions 13 of the wall of the illustrated mono pile may be applied as a gripping portion, to which a vibrator may be clamped, see FIG. 10a.

The illustrated structure, including the upper flange may be applied as a complete foundation, which may be positioned at a desired mounting site and subsequently serve as a foundation for e.g. a wind turbine tower, without performing further time consuming pre-processing between positioning if the foundation and the attachment of the tower to the foundation.

According to the illustrated embodiment of FIG. 1b a foundation body 111 has been pre-fitted with an additional vibration receiving interface in the form of four projections 113, to which a vibration arrangement, or other suitable attachment arrangement, may be fitted. FIGS. 10a and 10b illustrates such an arrangement.

According to the illustrated embodiment, a cross shaped structure 113, 114 is welded to the upper end of the foundation in such as way that the upper part of the foundation is minimally weakened, an advantageous vibration interface has been obtained. The established projections 113 may be gripped in a simple manner by the vibration arrangement and guide the vibration into the foundation structure.

According to the invention, the attachment measures needed for attaching wind turbine tower and a foundation may be completely or almost completely established prior to the positioning of the foundation in the underground.

According to the invention, the attachment arrangement should preferably comprise a pre-mounted attachment, which may be relatively unaffected by mechanical stress when positioning the foundation into the ground.

According to another advantageous embodiment of the invention, the flange 12 may for example be applied as the vibration interface. In other, a vibrator may be bolted to the flange 12 and the attachment arrangement (for the tower) may thereby serve as the vibration interface.

According to a very preferred embodiment of the invention, the wind turbine foundation comprises a wind turbine "injection foundation", i.e. the type of foundations adapted and dimensioned to be completed in one piece, and then subsequently be displaced suitably into the earth (underground) to which a wind turbine structure is to be anchored to.

According to a most preferred embodiment of the invention, the foundation comprises an offshore windturbine injection foundation.

The typical mounting procedure according to one embodiment of the invention involves the following steps, which subsequently will be described with reference to the below FIG. 3 to 8.

Foundation

Typically: four hours.

Initially, a crane, typically a jack-up crane must be fixedly positioned at the mounting site. A carrier, e.g. a barge or a selfpropelled floating arrangement may be positioned relative to the crane.

Then, a vibrator is fitted to the hook of a crane and lifted to upper part of the foundation where the complete arrangement is locked to the foundation body. See FIG. 9 for further details.

Thereafter, the complete arrangement, i.e. vibrator and foundation is lifted by the crane and positioned correctly on the bottom of the sea. Then, the foundation is driven into the underground by means of vibrations.

The foundation of a relatively large wind turbine may, depending on the application and the nature of the site underground, weight approximately 2-300 tomes.

A vibrator for that purpose may e.g. weight approximately 40-50 tonnes.

When the foundation is permanently correctly positioned, the vibrator is removed from the foundation.

Boat Landing System

Typically 1.5 hours.

Tower

Typically 2.25 hours.

The lifting of a wind turbine tower from the barge from its upright position at the barge to its upright position on the foundation includes moreover that the tower must be completely secured to the foundation.

Nacelle with Hub and Two Blades.

Typically 2.75 hours.

The lifting of a wind turbine with hub and two blades includes the mounting and lift up of yoke for the nacelle.

Blade Three

Typically 2.25 hours.

Barge Move to Next Site

Typically say 4 hours.

It should be noted that especially this process step may vary significantly, depending the nature of the mounting sites, weather, distances, etc. Moreover, it should be noted that other more untraditional methods of transportation of the towers and especially the foundations may be applied within the scope of the invention.

Crane Vessel Move to Next Site

Typically 3.5 hours.

This step may also vary significantly, again depending of the application and the involved equipment.

When arranging the above mentioned work-steps, i.e. not necessarily as a series of process steps but also involving parallel process steps, the overall mounting, may be finished up in approximately 18 hours, which constitutes a significant improvement over conventional mounting.

It should be noted that the above process steps may of course be varied, depending on application and purpose. Specifically, it should be noted that the steps of mounting the foundation and again mounting the tower to the foundation may be carried out more or less immediately subsequently to the finishing of the previous process step without prerequisite time-consuming preparation of the process step, such as cementing or other attachment processes needing long hardening.

In this way, the process step of mounting the tower to the foundation may be completely prepared previous to embarkation, i.e. on shore, and moreover, the lift, e.g. a jack up crane, may completely finish up the job before being transferred to other mounting sites. Obviously, this feature enables a more efficient use of lifts and other floating equipment FIG. 2 illustrate a complete offshore assembly setup according to a preferred embodiment of the invention. Evidently, other setups may be applied within the scope of the invention.

The illustrated setup comprises a barge 21 or another maritime vessel, here adapted for carrying two wind turbine components. Evidently suitable numbers of wind turbines may be applied.

The barge 21 is accompanied by a jack-up crane 22 adapted for disembarking the wind turbine components, here the foundation, tower the nacelle.

The crane will typically be secured to the bottom of the sea when lifting the wind turbine components to the mounting location and vibrating the structure into the underground.

FIG. 3a-to FIG. 8 illustrate a preferred mounting sequence of two offshore wind turbines.

FIG. 3a illustrates a side view of a barge 21 of FIG. 2. The illustrated barge is loaded with two vertically oriented wind turbine towers 34A, 34B. FIG. 3b illustrates the same components as seen from above.

The barge 21 is moreover loaded with likewise vertically oriented foundations 33A, 33B, two single wings 36A, 36B and two nacelles 32A, 321B, both pre-mounted with two wings 35A, 35B on an associated nacelle 32A, 32B.

FIG. 4 illustrates that the barge 21 has been located at a suitable disembarkation site by means of for example a tugboat 42.

Preferably, the barge should be secured to the crane or should e.g. comprise a jack-up structure itself in order to ensure that barge is substantially not-inclined in the water when the wind turbine components are lifted from the barge.

Moreover, a jack up crane has been brought to the location, towed or by own force. The jack up crane has been fixedly positioned at the site in order to prepare the disembarking and mounting of one or both of the wind turbines.

In FIG. 5, the first foundation 33B has been lifted from the barge 21 on lowered into the sea by the crane. Preferably, the vibrator has been pre-fitted to the foundation 33B and has been lifted together with the foundation 33B itself. When the foundation 33B has been positioned correctly on bottom of the sea, the vibrator is activated on the foundation is gradually vibrated into the underground.

According to another embodiment of the invention, the foundation may be lifted from the barge and positioned securely in the correct intended position, where-after the vibrator may be lifted and fitted to the top of foundation.

In FIG. 6, the foundation has been vibrated suitably into the underground and the crane may now lift the wind turbine tower 34B and position the tower 34B onto the foundation 33B. Now the tower may be fixedly attached to the foundation by means of e.g. bolting.

In FIG. 7, the nacelle 32B may now be lifted from the barge to the top of the previously positioned foundation and tower. The nacelle 32B carries two of its three wings on the hub while being lifted.

Details of the wing mounting is disclosed in the co-pending application filed by the current applicant and filed on the same day and having the title "Methods of handling wind turbine blades and mounting said blades on a wind turbine, system and gripping unit for handling a wind turbine blade", hereby incorporated by reference.

FIG. 8 illustrates the last main mounting step as the lifting and the mounting of the last wing onto the hub of the already mounted nacelle 32B.

U.S. Pat. No. 5,653,556 discloses a method of vibrating a foundation into the earth. This method, hereby incorporated by reference, may advantageously be applied for inserting a foundation of wind turbines into the earth.

According to different embodiments of the invention, the vibration arrangement for example be fitted to the foundation in connection with the crane on-hook operation.

According to a further embodiment of the invention, a vibration arrangement may be, pre-attached to the foundation, i.e. previous to the loading of the barge or other suitable maritime vessel. In this way, a rather complex attachment process in a relatively high altitude may be avoided and the dismounting of the vibrator may then be performed when the foundation is finally correctly positioned, i.e. in relatively low altitude.

FIG. 9a illustrates a clamp made according to the above mentioned principles of U.S. Pat. No. 5,653,556 applicable for the gripping of a foundation, for example foundation 33B by such a clamp, and subsequently for vibrating this foundation into the earth.

Basically, according to a preferred embodiment of the invention, a foundation for a wind turbine, e.g. a mono pile comprises a flange, onto which the tower of the wind turbine may be arranged and fastened. Moreover, the foundation comprises a section or a portion, to which clamps of a vibrator may be attached.

Preferably, the clamping of the vibrator should be clamped without stressing the flange of the foundation, thereby reducing the risk of weakening the foundation structure when inserting the foundation into the earth.

The illustrated vibrator 90 comprises a ring fitting 91 adapted for receiving a hook or a fitting of a crane, e.g. the above described crane 22.

The ring fitting 91 carries hydraulic vibration means 92 and moreover comprises attachment means 93. The attachment means 93 comprises for example four hydraulic cylinder pairs 94A, 94B adapted for gripping the side-wall of e.g. the foundation 33B.

Note, that the vibrator 90 basically grips the foundation without stressing the flange 331B of the foundation 33B when transmitting vibrations into the structure. In this way, the foundation may be lowered into the ground and be ready for receiving the wind turbine tower almost immediately after the final positioning of the foundation. In this way, the mounting of e.g. offshore wind turbines may be significantly improved compared to conventional mounting involving substantial work and time, e.g. when cementing a flange or the like to the upper part of the foundation.

Figure 2:
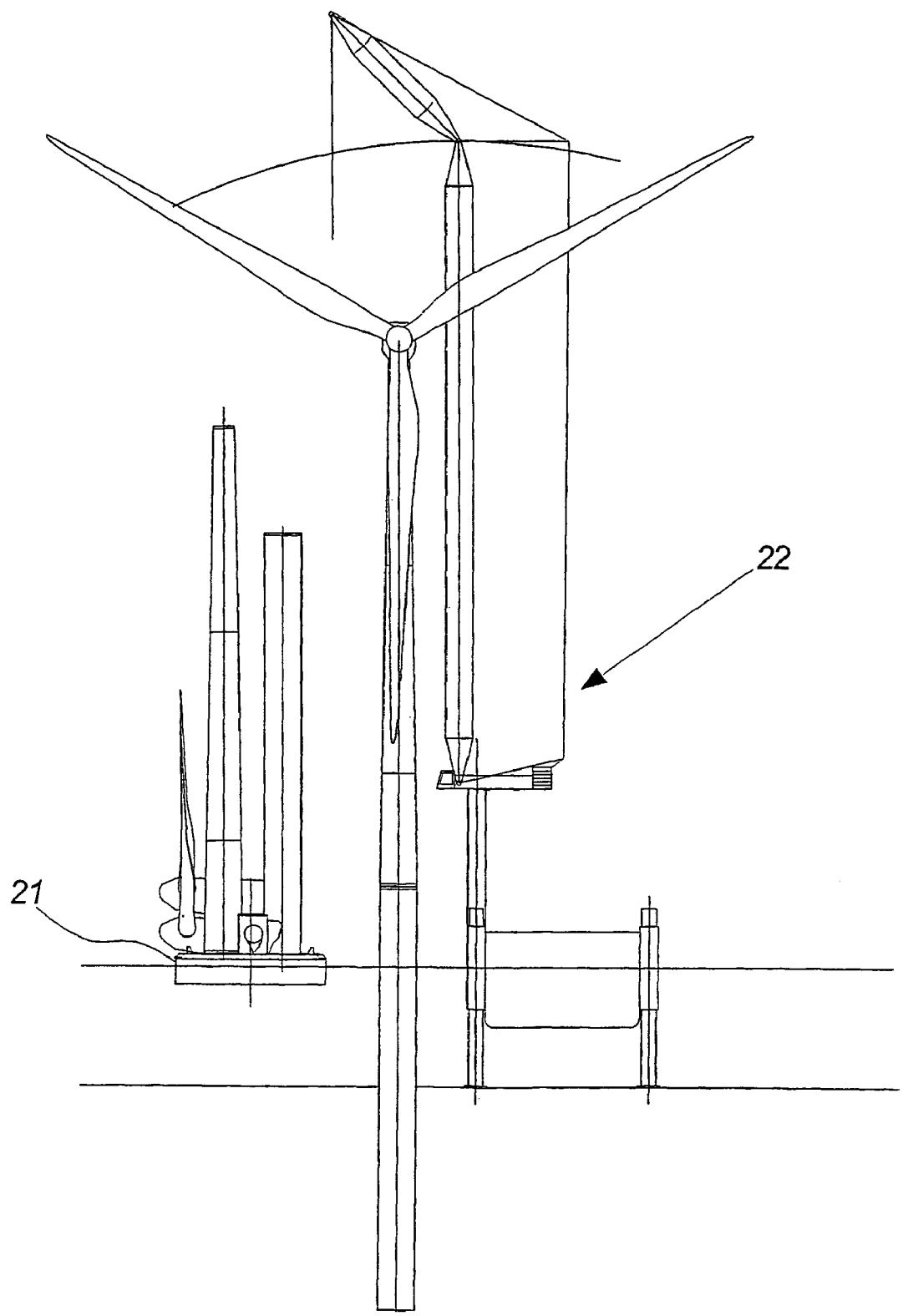
Figure 4:
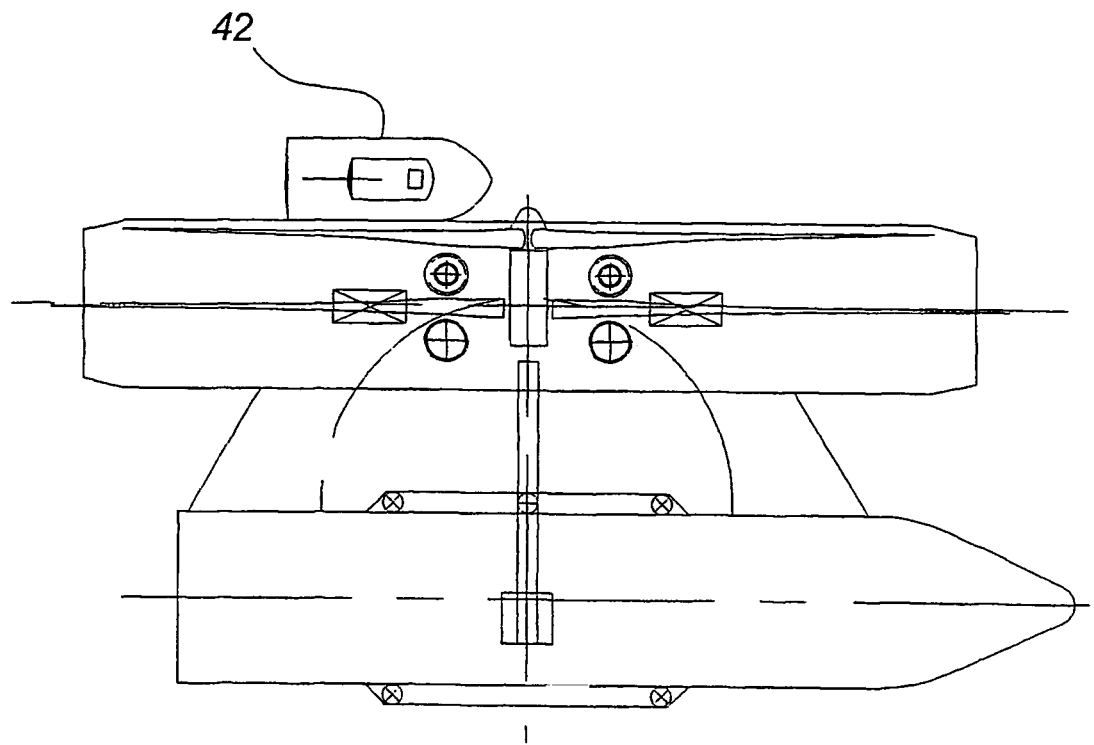
Figure 5:
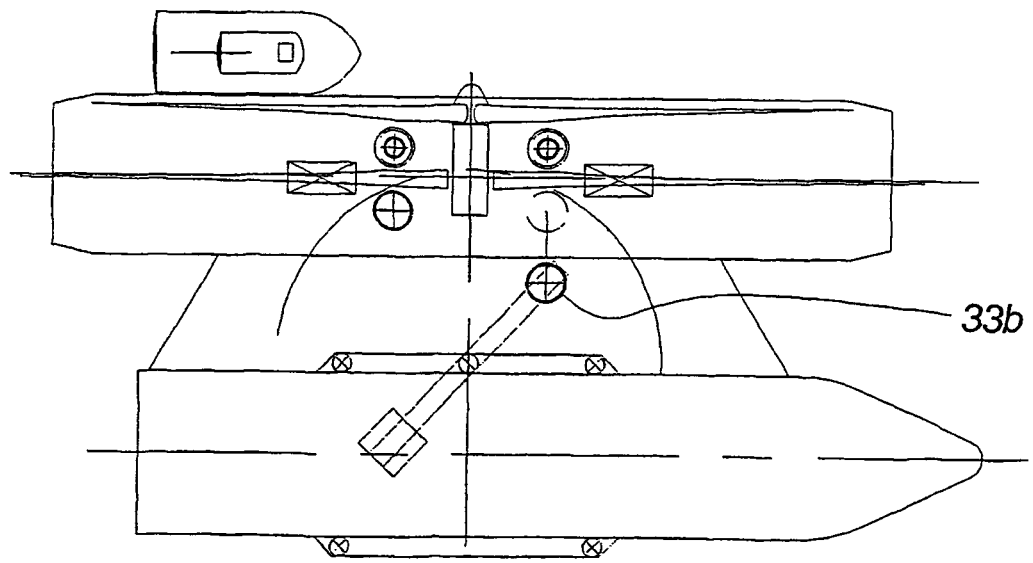
Figure 6:
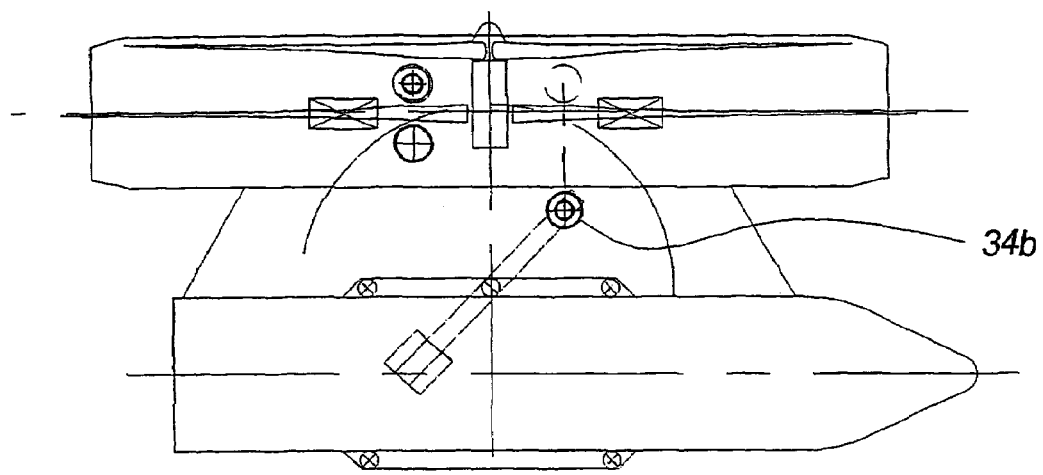
Figure 7:
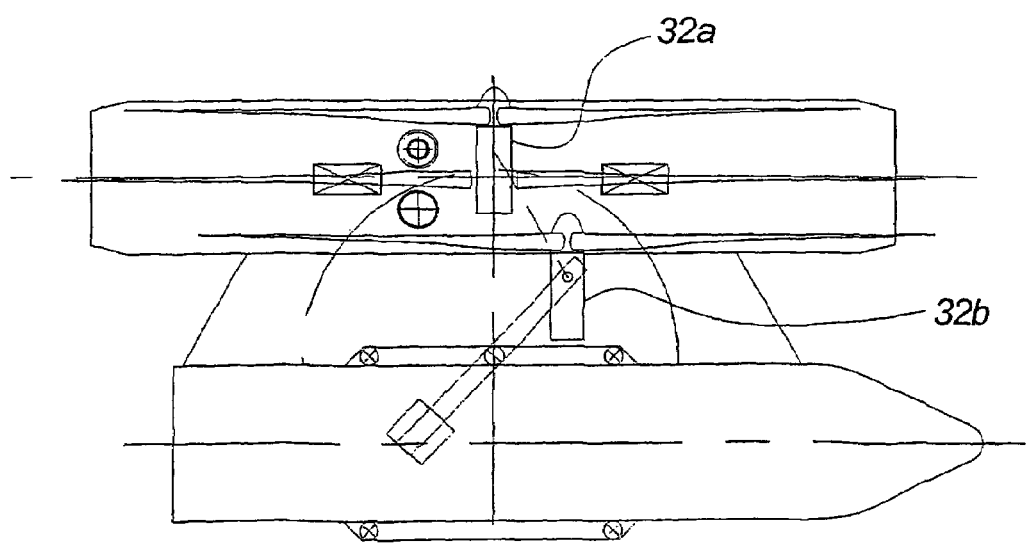
Figure 8:
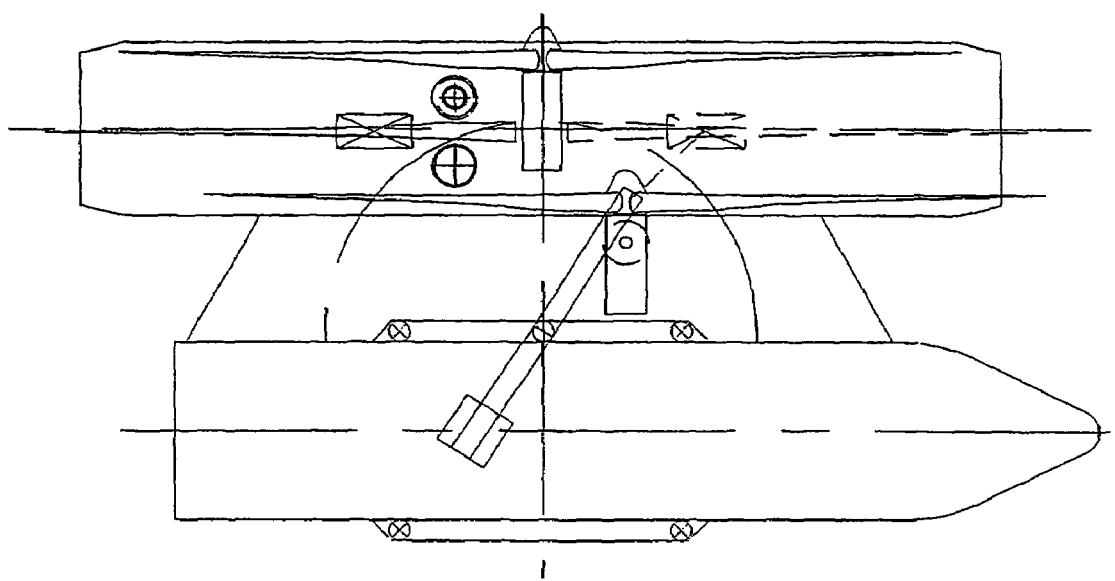
Figure 9A:
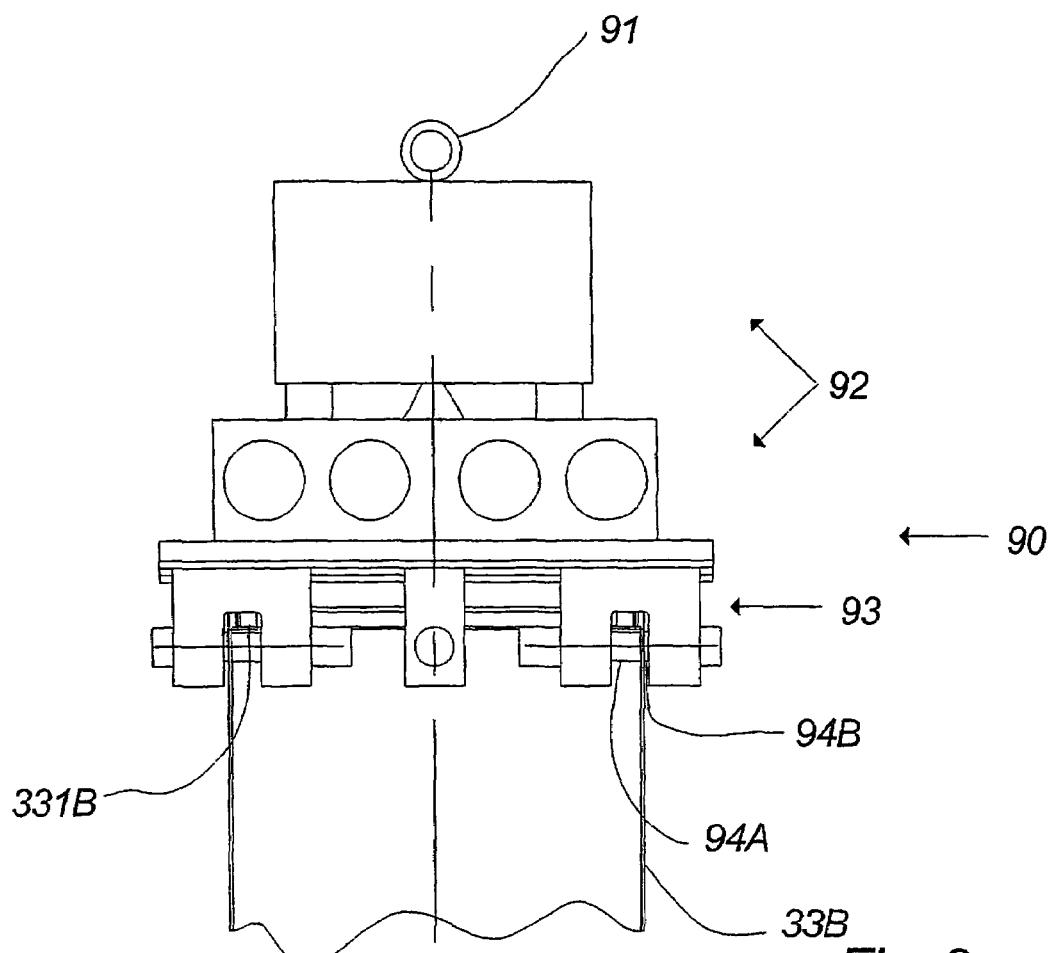
FIG. 9b illustrates the vibrator of FIG. 9a as seen from above.
Figure 9B:
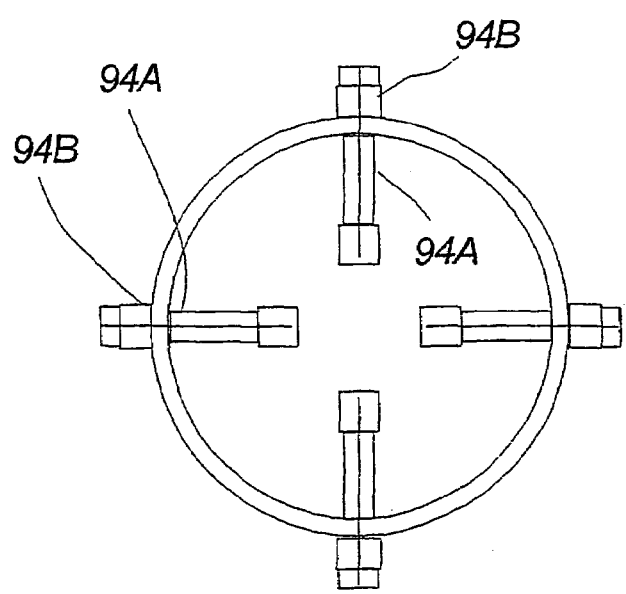
Figure 10A:
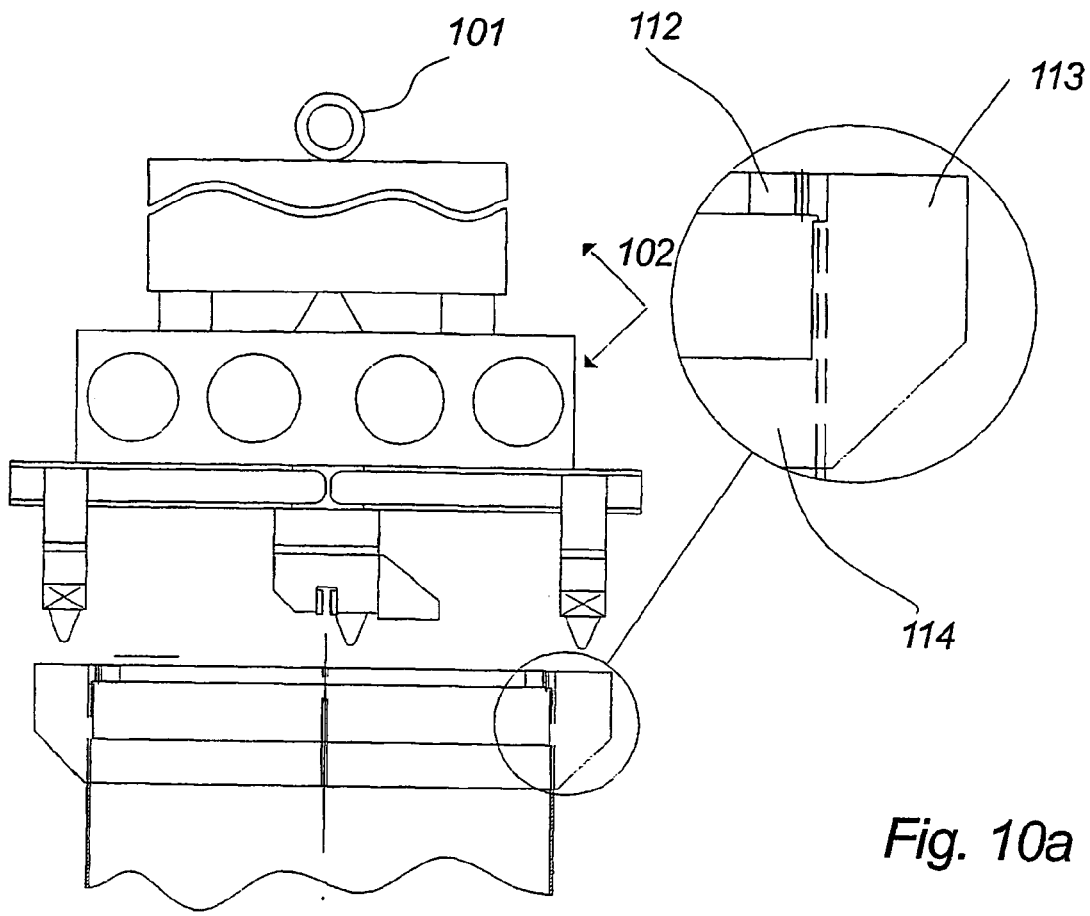
FIGS. 10a and 10b illustrate a further and preferred embodiment of the invention.
Figure 10B:
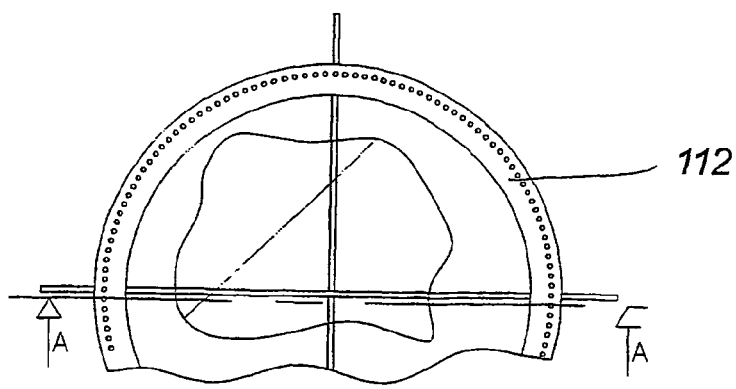

In main principles, the arrangement corresponds to the illustrated embodiment of FIG. 9a with an important modification. The illustrated upper end of a foundation corresponds to the illustrated embodiment of FIG. 1b.

According to the illustrated embodiment, a vibrator 102 comprises a clamp system adapted for gripping a number of outwardly oriented projections 113, here four projections 113 and then for exciting of vibrations into the foundation structure.

Again, no impact hammering is needed for the injection of the foundation into the underground, e.g. a seabed.

The invention claimed is:

1. Method of mounting a wind turbine at a mounting location, said method comprising:
   providing a foundation;
   said foundation comprising a foundation body and pre-fitted upper attachment means;
   vibrating said foundation at least partly into the earth by transferring of vibrations into the foundation by means of a vibration arrangement attached to said pre-fitted upper attachment means; and
   mounting at least a part of said wind turbine to said pre-fitted upper attachment means of said foundation.

2. Method of mounting a wind turbine according to claim 1, wherein said vibrations are established and transferred into the foundation body of the foundation.

3. Method of mounting a wind turbine according to claim 1, wherein said vibrations are transferred into the foundation via side wall(s) of the foundation.

4. Method of mounting a wind turbine according to claim 1, wherein said pre-fitted attachment means comprises at least one flange to which said at least part of the wind turbine may be attached to.

5. Method of mounting a wind turbine according to claim 1, wherein said vibrating is performed by transferring vibrations into the foundation via contact portions of side wall(s) of the foundation.

6. Method of mounting a wind turbine according to claim 1, wherein said vibrating is performed by the vibration arrangement fastened to part of the foundation by means of a clamping means.

7. Method of mounting a wind turbine according to claim 6, wherein said clamping means comprises hydraulic clamps.

8. Method of mounting a wind turbine according to claim 1, wherein said vibrations are established by vibrating means fitted to the foundation.

9. Method of mounting a wind turbine according to claim 1, wherein said foundation is suspended in the vibration arrangement when the foundation is lifted and positioned by means of a lifting means at the mounting location.

10. Method of mounting a wind turbine according to claim 1, wherein said foundation, when lifted by a lifting means, is suspended in a vibration means.

11. Method of mounting a wind turbine according to claim 1, wherein said foundation comprises at least one mono pile.

12. Method of mounting a wind turbine according to claim 1, wherein said at least part of the wind turbine comprises a wind turbine tower comprising at least one flange adapted for attachment to the foundation.

13. Method of mounting a wind turbine according to claim 12, wherein said wind turbine tower comprises a substantially one-piece tower.

14. Method of mounting a wind turbine according to claim 1, wherein said wind turbine comprises an offshore wind turbine.

15. Method of mounting a wind turbine according to claim 1, wherein said wind turbine is transported to said mounting location by a floating means.

16. Method of mounting a wind turbine according to claim 1, wherein two blades of said wind turbine are pre-fitted to a hub of a nacelle; thereby facilitating stacking of the pre-fitted nacelles and remaining blades.

17. Method of mounting a wind turbine according to claim 1, wherein lowering of the foundation into the earth by vibration is supplemented by a suction arrangement adapted for removal of underground forming components, such as sand, soil, etc.

18. Wind turbine foundation comprising:
at least one upper attachment arrangement adapted for mounting at least a part of a wind turbine;
said upper attachment arrangement comprising at least one interface portion to which a vibration arrangement may be attached;
said interface portion comprising at least a part of the foundation adapted for receipt of structural vibration from the vibration arrangement when said vibration arrangement is attached to the interface portion.

19. Wind turbine foundation according to claim 18, wherein the upper attachment arrangement comprises at least one upper flange.

20. Wind turbine foundation according to claim 18, wherein said foundation is pre-manufactured.

21. Wind turbine foundation according to claim 18, wherein said interface portion comprises at least one structure fastened to the foundation, said structure enabling a transfer of vibrations provided by the vibration arrangement into the foundation when the vibration arrangement is fastened to said structure.

22. Wind turbine foundation according to claim 21, wherein said structure comprises at least one projection of the foundation.

23. Wind turbine foundation according to claim 18, wherein said interface portion comprises at least a part of a side-wall of the foundation.

24. Wind turbine assembly comprising:
at least one wind turbine foundation;
said wind turbine foundation comprising an upper attachment arrangement adapted for mounting of at least a part of a wind turbine and said upper attachment arrangement comprising an interface portion to which at least one vibration arrangement may be attached;
at least one wind turbine tower;
at least one maritime vessel adapted for transportation of said at least one wind turbine foundation; and
at least one lift arrangement comprising means for positioning said at least one wind turbine foundation and said vibration arrangement at a mounting location.

25. Wind turbine assembly according to claim 24, wherein said lift arrangement comprises means for lifting and positioning and attaching said vibration arrangement to said at least one wind turbine foundation.

26. A wind turbine foundation according to claim 24, said interface portion comprising at least a part of the foundation adapted for receipt of structural vibration from the vibration arrangement when said vibration arrangement is attached to the interface portion.

27. Wind turbine foundation according to claim 24, wherein the at least one upper attachment arrangement comprises at least one upper flange.

28. Wind turbine foundation according to claim 24, wherein said foundation is pre-manufactured.

29. Wind turbine foundation according to claim 24, wherein said interface portion comprises the upper attachment arrangement.

30. Wind turbine foundation according to claim 24, wherein said interface portion comprises at least one structure fastened to the foundation, said structure enabling a transfer of vibrations provided by the vibration arrangement into the foundation when the vibration arrangement is fastened to said structure.

31. Wind turbine foundation according to claim 30, wherein said structure comprises at least one projection of the foundation.

32. Wind turbine foundation according to claim 24, wherein said interface portion comprises at least a part of a side-wall of the foundation.

* * * * *